Nov. 14, 1967     J. J. DOMICONE ET AL     3,352,703
METHOD FOR PRODUCING LIGHT-DIFFUSING COATINGS
OF TITANIA ON GLASS
Filed Jan. 24, 1964
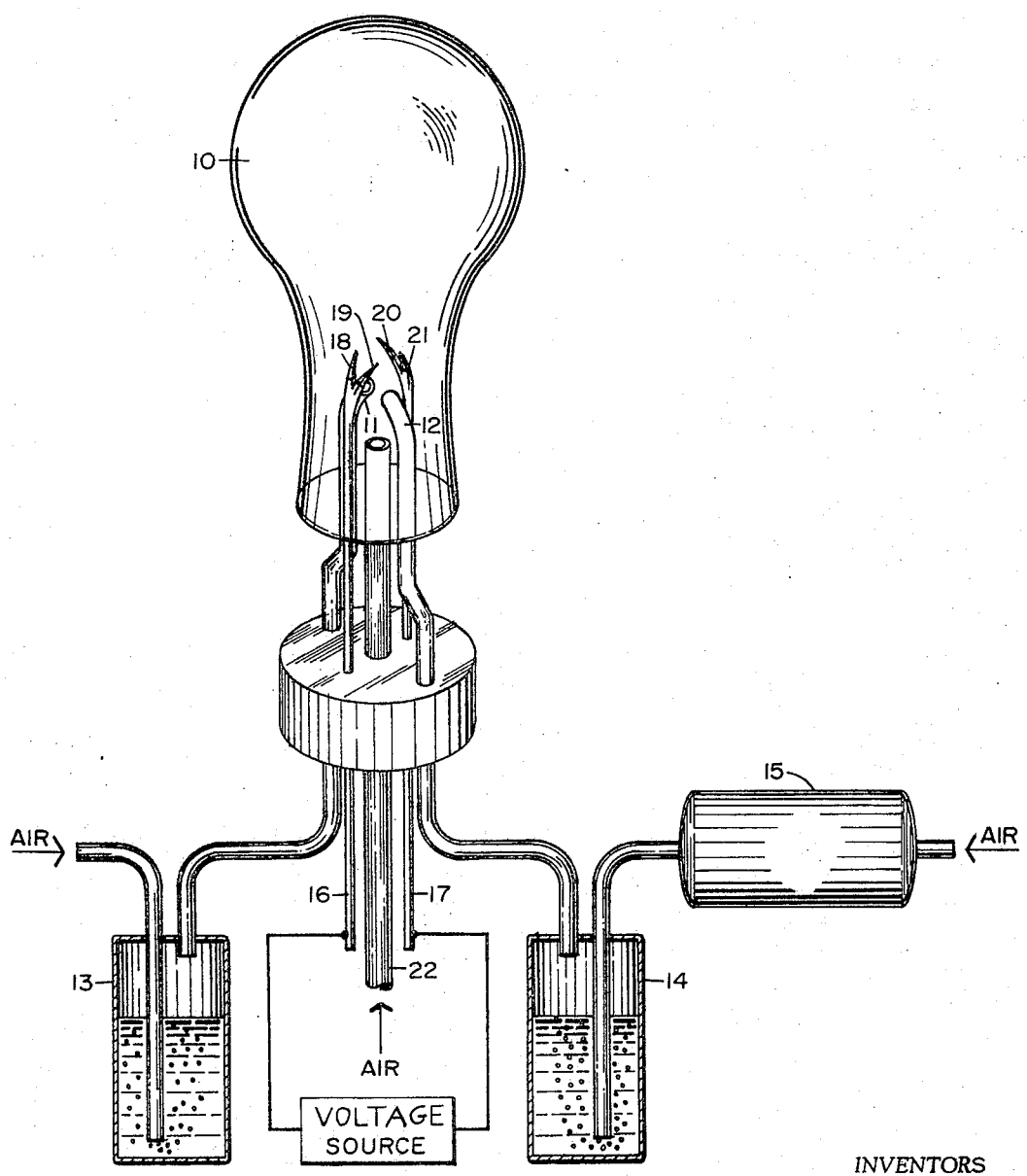
INVENTORS
Joseph J. Domicone
William C. Smith
Clarence R. Patty, Jr.
ATTORNEY 3,352,703
METHOD FOR PRODUCING LIGHT-DIFFUSING COATINGS OF TITANIA ON GLASS
Joseph J. Domicone, Elmira, and William C. Smith, Corning, N.Y., assignors to Corning Glass Works, Corning, N.Y., a corporation of New York
Filed Jan. 24, 1964, Ser. No. 339,933
8 Claims. (Cl. 117—17)

ABSTRACT OF THE DISCLOSURE

A method for forming light-diffusing coatings of titania on the interior surfaces of glass light bulb envelopes. A hydrolyzable compound of titanium, such as $TiCl_4$, is hydrolyzed to form particles of titania which are passed through an electric arc prior to deposition on the glass bulb.

---

This invention relates to the production of light-diffusing coatings on the interior surfaces of glass envelopes, such as envelopes utilized in incandescent electric light bulbs.

It is an object of the invention to produce coatings having light-diffusing properties superior to those of previously used coatings.

It is a further object of the invention to provide a method for depositing a coating of titania on the interior surface of a glass envelope at room temperatures.

A further object is the provision of a method whereby titania may be synthesized and deposited on a glass surface in a single operation.

These and other objects, which will be apparent from the detailed description of the invention, are accomplished, according to a preferred embodiment of the invention, by hydrolyzing a compound of titania and passing the reaction product through an electric arc located in the interior of a glass envelope to be coated.

The invention will be described with reference to the accompanying drawing, which is a schematic view of one form of apparatus suitable for carrying out the process of the invention.

Referring to the drawing, glass envelope 10, the type used in the manufacture of incandescent electric light bulbs, is supported with its neck oriented downward. Hollow tubes 11 and 12 extend into the interior of the glass envelope and supply thereto, respectively, moist air and $TiCl_4$ vapors. The moist air is produced by bubbling air through water in bubbler 13, while $TiCl_4$ vapors are produced by passing through $TiCl_4$ in bubbler 14 air which has previously been dried by passage through drying tube 15. The vapors emerging from tubes 11 and 12 combine to form titania according to the equation:

$$TiCl_4 + 2H_2O = TiO_2 + 4HCl$$

The vapors rise and pass through an electric arc between electrodes 16 and 17. Electrodes 16 and 17 are preferably formed of tungsten, and, preferably, each comprises two separate projections having platinum tips 18 and 19 and 20 and 21, respectively. It has been found that the use of platinum electrode tips is preferable to prevent electrode consumption and deposition of the electrode material on the interior of the bulb. Projection 18 is opposed to projection 20, while projection 19 is opposed to projection 21, thereby producing two separate arcs when a voltage is applied between the respective electrodes. Although such bifurcated electrodes are not essential, it has been found that the two electric arcs produced thereby permit the production of particles of $TiO_2$ having sizes smaller than those produced when a single arc is employed. In addition, better adhesion between the particles and the glass surface is obtained. Similarly, additional air is supplied through tube 22 in order to elongate the arcs, thereby effecting greater contact between the $TiO_2$ and the arcs.

In order to effect even distribution of the coating on the inside of envelope 10, it is preferable that the electrodes be oriented about the axis of the envelope and that the envelope be rotated about its axis during the coating operation.

Although various methods have been attempted in the past for depositing light-diffusing coatings on glass, it has been found that coatings having light-diffusing properties and adherence satisfactory for use in electric light bulbs can be produced when the glass surface to be coated is maintained at room temperatures only when an electric arc is employed according to the present process. Although the parameters of the present process will vary according to the size and shape of the glass surface to be coated, when the object to be coated is a glass envelope for a conventional incandescent electric light bulb, the respective electrodes may be spaced approximately one-half inch apart, and an arc starting voltage of approximately 5,000 volts alternating at 60 cycles per second may be employed. After the arc has been started, it may be maintained at approximately 1100 volts and with a current of approximately 25 milliamperes. Moist air may be supplied through tube 11 at a rate of 5 liters per minute, and air containing $TiCl_4$ may be supplied through tube 12 at a rate of 5 liters per minute. Air may be supplied to tube 22 at the rate of 6 liters per minute. The process is carried out at room temperature. Under these conditions there will be formed in approximately eighteen seconds a coating which has the ability to transmit approximately 93% of the light emitted from an incandescent electric light filament while masking the filament and providing a uniform glow across the entire envelope surface.

Although the most satisfactory light-diffusing coatings have been produced by hydrolysis of $TiCl_4$, it will be appreciated that other compounds of titanium, such as tetrabutyl titanate and tetraisopropyl titanate, may be employed for such purpose. Appropriate voltages will vary according to electrode configuration and spacing, and any voltage, either AC or DC, sufficient to maintain an arc is satisfactory for the practice of the invention. Such voltages can easily be determined experimentally by those skilled in the art.

Although it is preferable from considerations of both efficiency and speed of coating that $TiO_2$ be formed by hydrolysis and immediately pass through an electric arc in a single operation or that the $TiO_2$ be formed in the arc, such procedure is not essential. Finely divided $TiO_2$ may be produced independently, either by hydrolysis or otherwise, and particles thereof subsequently mechanically injected into an electric arc in the vicinity or a surface to be coated.

Inasmuch as the foregoing description has been provided solely as that of a preferred embodiment of the present invention, it is intended that the cope of the invention be limited only by the scope of the appended claims.

We claim:
1. The method of forming a light-diffusing coating on a glas surface which comprises injecting finely divided titania into a electric arc in the vicinity of said surface, and subsequently collecting said titania on said surface.
2. The method of forming a light-diffusing coating on the interior surface of a hollow glass article which comprises maintaining an electric arc in said interior, injecting finely divided titania into said arc and subsequently collectng said titania on said surface.

3. The method of forming a light-diffusing coating on the interior surface of a glass envelope for an incandescent electric light bulb which comprises maintaining an electric arc in said interior, injecting finely divided particles of titania into said arc and subsequently collecting said titania on said surface.

4. The method of forming a light-diffusing coating on a glass surface which comprises providing a compound of titanium which is hydrolyzable to form titania, hydrolyzing said compound to form titania, passing said titania through an electric arc in the vicinity of said glass surface and subsequently collecting said titania on said surface.

5. The method according to claim 4 in which said compound comprises $TiCl_4$.

6. The method according to claim 4 in which said glass surface comprises the interior surface of a glass envelope for an incandescent electric light bulb.

7. The method according to claim 6 in which said compound comprises $TiCl_4$.

8. The method of forming a light-diffusing coating on a glass surface which comprises providing a compound of titanium which is hydrolyzable to form titania, hydrolyzing said compound of titanium in an electric arc to form titania in the vicinity of said glass surface and collecting said titania on said surface.

References Cited

UNITED STATES PATENTS

| | | | |
|---|---|---|---|
| 1,931,380 | 10/1933 | Haber et al. | 117—106 |
| 2,449,655 | 9/1948 | Keiffer | 118—622 X |
| 2,860,094 | 11/1958 | Ishizuka | 204—164 |
| 2,982,668 | 5/1961 | Gunther et al. | 117—106 |
| 2,995,463 | 8/1961 | Meister et al. | 117—97 X |
| 3,058,866 | 10/1962 | Gunther et al. | 117—97 X |
| 3,182,839 | 5/1965 | Hoag | 117—97 |
| 3,220,880 | 11/1965 | Fenersanger | 117—106 |
| 3,239,368 | 3/1966 | Goodman | 204—164 X |

ALFRED L. LEAVITT, *Primary Examiner.*

RALPH KENDALL, *Examiner.*

A. GOLIAN, *Assistant Examiner.*